United States Patent [19]
Wegmann

[11] 3,906,845
[45] Sept. 23, 1975

[54] PUMP SEAL
[75] Inventor: Jerome B. Wegmann, St. Louis, Mo.
[73] Assignee: McNeil Corporation, Akron, Ohio
[22] Filed: Jan. 7, 1974
[21] Appl. No.: 431,061

[52] U.S. Cl. .................................. 92/168; 417/554
[51] Int. Cl.² ..................... F16J 15/18; F04B 21/04
[58] Field of Search ...... 417/541, 437, 554; 92/168; 277/58, 64

[56] References Cited
UNITED STATES PATENTS

| | | | |
|---|---|---|---|
| 336,039 | 2/1886 | Darnell | 417/541 |
| 2,320,589 | 6/1943 | Gruetjen | 277/64 |
| 2,443,332 | 6/1948 | Summers | 277/64 |
| 2,451,888 | 10/1948 | Thompson | 277/58 |
| 2,795,195 | 6/1957 | Amblard et al. | 417/437 |
| 2,815,970 | 12/1957 | Wallace | 277/58 |
| 2,828,696 | 4/1958 | Wright | 92/168 |
| 3,109,293 | 4/1963 | Williams et al. | 277/26 |
| 3,559,540 | 2/1971 | Sheldon | 92/168 |
| 3,577,833 | 5/1971 | Skelton | 92/168 |

*Primary Examiner*—William L. Freeh
*Attorney, Agent, or Firm*—Koenig, Senniger, Powers and Leavitt

[57] ABSTRACT

A pump comprising a cylinder, a plunger reciprocable in the cylinder, and means for providing a seal between the plunger and the cylinder comprising an outwardly facing annular abutment in the cylinder, packing on the abutment, and a resilient elastomeric ring under compression in the cylinder forcing the packing against the abutment to cause the packing to expand radially inwardly into sealing engagement with the plunger and radially outwardly into sealing engagement with the cylinder, the elastomeric ring being sealed by the packing from the material being pumped.

6 Claims, 5 Drawing Figures

PUMP SEAL

BACKGROUND OF THE INVENTION

This invention relates to pump seals, and more particularly to a seal for the plunger of a plunger pump.

The invention involves a seal for a plunger pump generally of the type shown in the Rotter et al. U.S. Pat. No. 3,312,178 issued Apr. 4, 1967. The provision of seals for such pumps for pumping certain solvents such as methyl ethyl ketone and toluene which tend to make rubber swell has presented problems both in the use of a rubber in the seal and the elimination of rubber from the seal, the former involving the swelling problem and the latter involving dimensional problems (oversize seals).

SUMMARY OF THE INVENTION

Among the several objects of the invention may be noted the provision of an efficient, compact and relatively economical seal for the plunger of a plunger pump which is adapted to handle materials such as methyl ethyl ketone and toluene; and the provision of such a seal which, while advantageously utilizing a rubber component for compactness of the seal, is capable of handling materials such as methyl ethyl ketone and toluene without damage to the seal.

In general, the invention involves means for providing a seal between the plunger and the cylinder of a plunger pump comprising an outwardly facing annular abutment in the cylinder, packing on the abutment, and a resilient elastomeric ring under compression in the cylinder forcing the packing against the abutment to cause the packing to expand radially inwardly into sealing engagement with the plunger and radially outwardly into sealing engagement with the cylinder, the ring being sealed by the packing from the material being pumped, and thereby being protected from said material. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
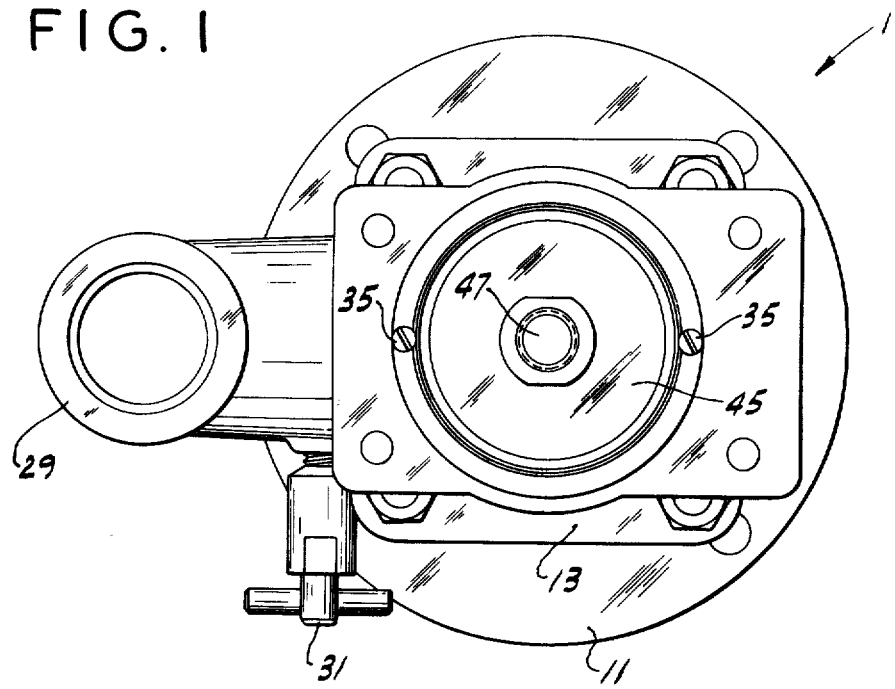
FIG. 1 is a plan of a plunger pump having a seal of this invention.

Referring to the drawings, there is generally indicated at 1 a pump comprising a cylinder indicated in its entirety at 3, a plunger generally designated 5 reciprocable in the cylinder, and means of this invention indicated at 7 for providing a seal between the plunger 5 and the cylinder 3. The cylinder 3 comprises a main cylindrical body 9 having a head 11 at one end constituting its inlet end (its lower end as illustrated) and a head 13 at its other end constituting its outlet end (its upper end as shown). The inlet end head 11 is formed with an inlet 15 for the material to be pumped, which enters via a tubular inlet member 16 threaded in the lower end of head 11, inlet 15 having a ball check valve member 17 therein adapted to open for entry of material into the lower end of the cylinder on an upward stroke of the plunger 5, and to close on a downward stroke of the plunger 5. The upper end head 13 of the cylinder 3 has an opening 19 formed by a short bore 21 intermediate its ends, a counterbore 23 extending down from its upper end to the annular shoulder 25 at the upper end of the bore 21, and a flaring section 27 extending down from the bore 21 to the lower end of the head and opening into the main body 9 of the cylinder. Head 13 is further formed with a lateral outlet 29 extending outwardly from the flaring section 27, the outlet having a suitable valve 31 therein for pump priming purposes.

The counterbore 23 is of smaller diameter than the internal diameter of the main body 9 of the cylinder and has a bushing 33 secured therein as indicated at 35. The plunger 5 comprises a tube 37 slidable in bushing 33, extending down through the flaring section or passage 27 into the main body 9 of the cylinder and having a piston 39 at its lower end in sliding sealing engagement with the internal surface of the main body 9 of the cylinder. The plunger tube 37 has a check valve 41 in its lower end adapted to open on a downward stroke of the tube and to close on an upward stroke of the tube. Immediately above the check valve, the tube 37 has lateral ports such as indicated at 43. The upper end of the tube is closed by a plug 45 having a threaded extension 47 for connection thereto of suitable means (not shown) for reciprocating the tube. The arrangement is such that on an upward stroke of the plunger 5, the inlet check valve 17 opens and material to be pumped is drawn into the cylinder 3 below the piston 39 via the inlet 15. The check valve 41 at the lower end of the plunger tube 37 closes, and the piston 39 forces material above the piston upwardly out of the cylinder for delivery via the lateral pump outlet 29. On a downward stroke of the plunger, the inlet check valve 17 closes, and the piston 39 forces material upwardly through the check valve passage 49 at the lower end of the pump tube 37 into the pump tube, through ports 43 into the cylinder above the piston 39 and out through the outlet 29. Thus, the pump is a double-acting pump, operating to deliver the pumped material both on an upstroke and a downstroke of the plunger.

Figure 3:
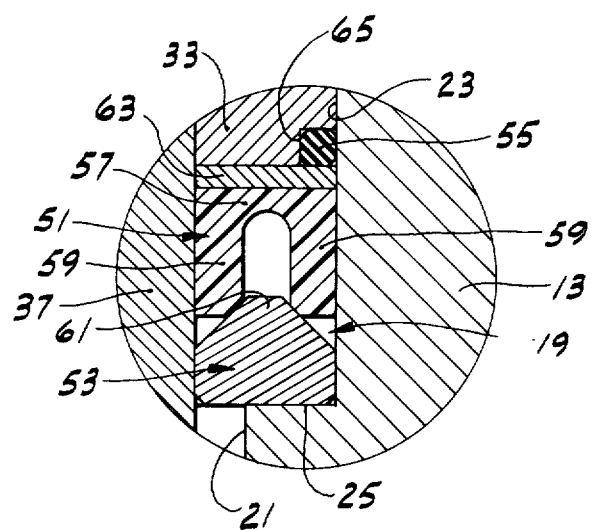
FIG. 3 is an enlarged fragment of FIG. 2 showing the seal.
Figure 2:
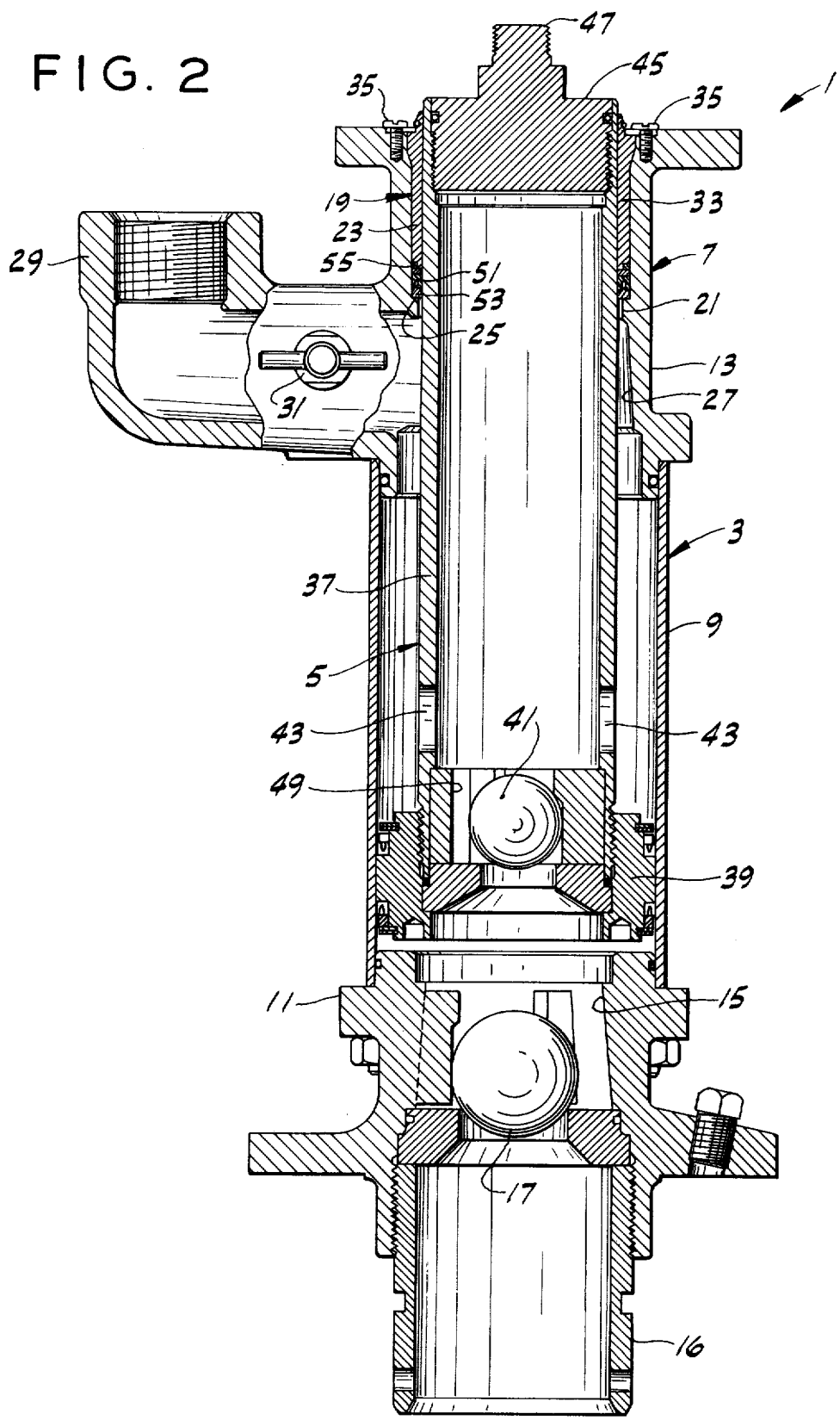
FIG. 2 is a longitudinal section of the pump.

Means 7 for providing a seal between the plunger means 5 and the cylinder 3 is disposed between the annular shoulder 25 at the lower end of the counterbore 23 (which shoulder faces outwardly toward the upper end of head 13) and the lower end of the bushing 33 secured in the counterbore. In accordance with this invention, the sealing means 7 comprises packing constituted by a sealing ring 51 (see particularly FIG. 3) fitting between the exterior of the plunger tube and the interior of the head 13 of cylinder 3 in the counterbore 23, this packing or sealing ring 51 being expandable radially inwardly into engagement with the plunger tube 37 and radially outwardly into engagement with the interior of the head 13 of cylinder 3 in the counterbore 23. The packing or sealing ring 51 is expanded by being biased downwardly against an annular abutment member or packing expanding ring 53 seated on the shoulder 25 in the opening 19, the downward bias being effected by a resilient elastomeric ring 55 under compression in the opening 19 and sealed by the packing or sealing ring 51 from the material being pumped. More particularly, the sealing ring 51 is of channel shape in cross-section having an upper flat web 57 and spaced apart flanges or lips 59 extending downwardly from the web, these lips being expandable by wedging.

It is made of a suitable resilient material which is resistant to the material being pumped, e.g., a polymerized tetrafluorethylene (TEFLON) — high density polyethylene material. The annular abutment member or packing expanding ring 53, which is seated on the shoulder 25, has a cross-section somewhat wider than the shoulder 25 so that it projects radially inwardly from the shoulder, and is tapered in cross-section at its top so as to provide an annular wedge 61 for wedging apart the flanges or lips 59 of the sealing ring 51 thereby to effect the radially inward and outward expansion of the cross-section of the ring 51 when it is forced down on the wedge 61. The lips extend down from web 57 on opposite sides of the wedge. A flat metal ring 63 constituting a gland is interposed between the elastomeric ring 55 and the sealing ring 51. If desired, a stainless steel ring of inverted V-shape (not shown) may be used in the ring 51 for engagement with the wedge 61.

The inner lip 59 of the packing or sealing ring 51 seals against the plunger tube 37 and the outer lip 59 of ring 51 seals against the internal cylindrical surface of the counterbore 23 above the shoulder 25. The reslilient elastomeric ring 55 is accommodated in an annular groove 65 in the outside of the lower end of the bushing and it sealed off by the ring 51 from the material being pumped; thus it is possible simply to use a suitable conventional rubber O-ring, e.g., a "Buna N" rubber O-ring, at 55 without subjecting it to the swelling effect of certain materials which may be pumped, such as methyl ethyl ketone or toluene. Use of a rubber O-ring at 55 enables provision of the sealing means 7 in compact manner, i.e., of relatively small dimensions both longitudinally and radially. This is in contrast to use of a compression spring, for example, to expand ring 51, noting that a spring would necessarily have much greater length than the diameter of the O-ring, thus use of a spring would require making the pump considerably longer. While use of a spring washer (e.g., a wave washer) might be considered, the pump assembly is generally too small for incorporation of a spring washer of sufficient strength to expand ring 51.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A pump comprising a cylinder, a plunger reciprocable in the cylinder, a head at one end of the cylinder having an opening for the plunger, the head having an annular shoulder facing outwardly in the opening, a bushing in the opening having its inner end spaced from the shoulder, a resilient elastomeric ring, an expandable packing ring, and a packing expanding ring between the inner end of the bushing and the shoulder, the packing expanding ring being seated on the shoulder, the packing ring engaging the packing expanding ring and being expandable radially inwardly into sealing engagement with the plunger and radially outwardly into engagement with the head by being forced against said expanding ring, and the resilient elastomeric ring being under compression between the inner end of the bushing and the packing ring to force the packing ring against said expanding ring, said resilient elastomeric ring being sealed by the packing ring from the material being pumped 2. A pump as set forth in claim 1 wherein said packing ring expandable a cross-section excpaandalbe by wedging, and said expanding ring comprises a wedge for expanding the cross-section of the packing ring.

3. A pump as set forth in claim 2 wherein said packing ring is generally of channel shape in cross-section, having a web and lips extending from the web on opposite sides of said wedge.

4. A pump as set forth in claim 3 having a flat ring constituting a gland between the elastomeric ring and the packing ring.

5. A pump as set forth in claim 4 wherein the bushing has an annular groove at its inner end receiving the elastomeric ring.

6. A pump as set forth is claim 5 wherein the groove is at the outside of the inner end of the bushing.

* * * * *